(12) United States Patent
Mita et al.

(10) Patent No.: US 10,894,420 B2
(45) Date of Patent: Jan. 19, 2021

(54) EJECTION-MATERIAL INJECTING METHOD, EJECTION-MATERIAL EJECTION APPARATUS, AND IMPRINTING APPARATUS

(71) Applicant: CANON KABUSHIKI KAISHA, Tokyo (JP)

(72) Inventors: Yutaka Mita, Utsunomiya (JP); Tsuyoshi Arai, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/371,312

(22) Filed: Apr. 1, 2019

(65) Prior Publication Data
US 2019/0315128 A1    Oct. 17, 2019

(30) Foreign Application Priority Data

Apr. 11, 2018 (JP) .................................. 2018-076100
Dec. 25, 2018 (JP) .................................. 2018-241285

(51) Int. Cl.
| | | |
|---|---|---|
| *B41J 2/175* | (2006.01) | |
| *B41J 2/045* | (2006.01) | |
| *B41J 2/44* | (2006.01) | |
| *C09D 11/101* | (2014.01) | |

(52) U.S. Cl.
CPC ....... *B41J 2/17523* (2013.01); *B41J 2/04581* (2013.01); *B41J 2/17553* (2013.01); *B41J 2/44* (2013.01); *C09D 11/101* (2013.01)

(58) Field of Classification Search
CPC ...... B41J 2/17523; B41J 2/44; B41J 2/04581; B41J 2/17553; B41J 2/175; B41J 2/18; B41J 2/17513; B41J 3/407; B41J 11/002; B41J 2/01; C09D 11/101
See application file for complete search history.

(56) References Cited

U.S. PATENT DOCUMENTS

| | | |
|---|---|---|
| 8,394,282 B2 | 3/2013 | Panga et al. |
| 9,415,418 B2 | 8/2016 | Sreenivasan et al. |
| 9,718,096 B2 | 8/2017 | Sreenivasan et al. |
| 9,946,173 B2 | 4/2018 | Funayoshi et al. |
| 10,315,354 B2 | 6/2019 | Matsumoto et al. |
| 10,336,080 B2 | 7/2019 | Kudo et al. |
| 10,696,058 B2 | 6/2020 | Kudo et al. |
| 2016/0288378 A1 | 10/2016 | Arai et al. |

(Continued)

FOREIGN PATENT DOCUMENTS

| | | |
|---|---|---|
| CN | 202702888 U | 1/2013 |
| CN | 105682808 A | 6/2016 |
| CN | 106019823 A | 10/2016 |

(Continued)

OTHER PUBLICATIONS

IP.com search (Year: 2020).*
First Office Action in Chinese Application No. 201910282496.9 (dated Sep. 2020).

*Primary Examiner* — Lisa Solomon
(74) *Attorney, Agent, or Firm* — Venable LLP (57) ABSTRACT

An ejection material is injected into a container through a pipe. Thereafter, the pipe is blocked at a blocked part and then the pipe is cut off. The pipe is cut off such that the blocked part is included in a portion of the pipe connected to the container.

17 Claims, 7 Drawing Sheets

(56) References Cited

U.S. PATENT DOCUMENTS

2017/0100940 A1\* 4/2017 Ishizawa ............... B41J 2/17523
2017/0246879 A1\* 8/2017 Kudo ................... B41J 2/17553

FOREIGN PATENT DOCUMENTS

| CN | 106042650 A | 10/2016 |
|---|---|---|
| CN | 106104751 A | 11/2016 |
| CN | 107128074 A | 9/2017 |
| JP | 5761334 B2 | 8/2015 |
| WO | 2016/205249 A1 | 12/2016 |

\* cited by examiner

FIG.7

EJECTION-MATERIAL INJECTING METHOD, EJECTION-MATERIAL EJECTION APPARATUS, AND IMPRINTING APPARATUS

BACKGROUND OF THE INVENTION

Field of the Invention

The present invention relates to an injecting method and an ejection apparatus for a liquid or liquid-like ejection material, and an imprinting apparatus including the ejection apparatus.

Description of the Related Art

Japanese Patent No. 5761334 describes a method of inserting a liquid injection pipe into an elastic plug that blocks an opening of a container of a liquid cartridge in order to inject a liquid (an ejection material) into the container, the liquid being ejected from an ejection head. After the liquid is injected into the container through the injection pipe, the injection pipe is pulled out of the plug.

SUMMARY OF THE INVENTION

In recent years, imprinting apparatuses designed to bring a mold provided with a pattern thereon into contact with an imprint material applied onto a substrate, and thus to transfer a form on the mold onto the imprint material so as to form the pattern thereon have been put into practical use in manufacturing processes of semiconductor devices and the like. In order to apply the imprint material onto the substrate, such an imprinting apparatus uses an ejection apparatus or the like which is configured to eject the imprint material contained in a container from an ejection head. The imprint material to be ejected as an ejection material from the ejection head is required to have a high degree of cleanness.

The method of injecting the liquid described in Japanese Patent No. 5761334 has a risk of allowing a foreign substance floating in an external space to enter the container when inserting the injection pipe into the plug on the container and pulling the injection pipe out of the plug. Moreover, there is also a risk that another foreign substance generated by friction between the plug on the container and the injection pipe enters the liquid. For these reasons, the ejection material such as the imprint material required to have the high degree of cleanness cannot be injected into the container by the injecting method described in Japanese Patent No. 5761334.

The present invention provides an ejection-material injecting method, an ejection-material ejection apparatus, and an imprinting apparatus which are capable of injecting an ejection material required to have a high degree of cleanness such as an imprint material into a container without causing contamination of the ejection material.

In the first aspect of the present invention, there is provided an ejection-material injecting method of injecting an ejection material into a container in an ejection apparatus capable of ejecting the ejection material in the container from an ejection head, comprising:

a connecting step of connecting the container and a tank configured to contain the ejection material to each other by using a pipe;

an injecting step of injecting the ejection material in the tank into the container through the pipe;

a blocking step of blocking the pipe in a state of being connected between the tank and the container after the injecting step; and a cutting step of cutting off the pipe after the blocking step such that the pipe is separated into a first portion connected to the container and a second portion connected to the tank, and that a blocked part of the pipe blocked in the blocking step is included in the first portion.

In the second aspect of the present invention, there is provided an ejection-material ejection apparatus comprising:

a container configured to contain an ejection material;

an ejection head capable of ejecting the ejection material in the container;

a pipe connected to the container so as to inject the ejection material into the container; and a covering configured to cover the pipe, wherein the pipe includes a blocked part blocked after injection of the ejection material into the container, and a cut-off part cut off in such a way as to retain the blocked part.

In the third aspect of the present invention, there is provided an imprinting apparatus configured to process a substrate by transferring a pattern of a mold to an imprint material applied to the substrate, comprising:

an imprint-material ejection apparatus configured to eject the imprint material in a container from an ejection head so as to apply the imprint material onto the substrate, wherein the imprint-material ejection apparatus includes a pipe connected to the container so as to inject the imprint material into the container, and a covering configured to cover the pipe, and the pipe includes a blocked part blocked after injection of the imprint material into the container, and a cut-off part cut off in such a way as to retain the blocked part.

According to the present invention, the ejection material is injected into the container through the pipe and then the pipe is blocked and cut off. Thus, it is possible to inject the ejection material into the container without contaminating the ejection material Further features of the present invention will become apparent from the following description of exemplary embodiments with reference to the attached drawings.

DESCRIPTION OF THE EMBODIMENTS

Embodiments of the present invention will be described below with reference to the drawings.

First Embodiment

Figure 1A:
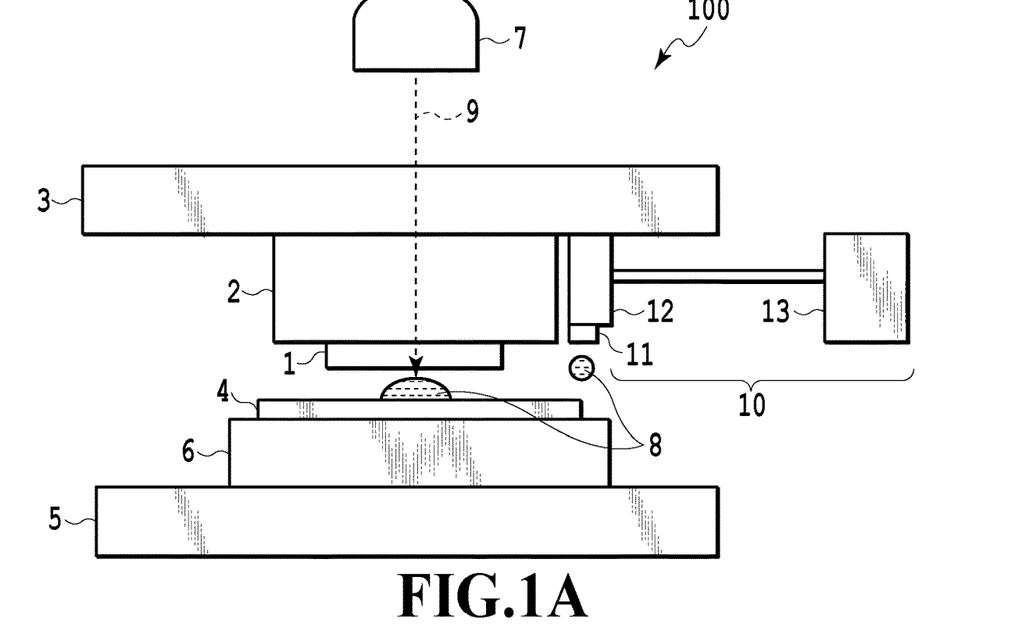
FIG. 1A is a schematic configuration diagram of an imprinting apparatus and FIG. 1B is an explanatory diagram of an ejection apparatus in FIG. 1A.

FIG. 1A is a schematic configuration diagram of an example of an imprinting apparatus. In this example, an ultraviolet curable resin is used as an imprint material and the resin is cured by irradiation with ultraviolet rays. Nonetheless, the raw material of the imprint material and the curing method are not limited. For instance, a photo-curing resin may be cured by irradiation with light having wavelengths outside the ultraviolet range by using a light irradiation apparatus. Alternatively, a thermosetting resin may be used and cured by heating.

An imprinting apparatus 100 in FIG. 1A includes an ejection apparatus 10 that ejects an imprint material 8, and a mold 1. Here, the imprinting apparatus 100 that includes the mold 1 may be constructed separately from the ejection apparatus 10. Specifically, the imprint material 8 may be ejected onto a substrate 4 by using the ejection apparatus 10 and imprinting may be performed by using the mold 1 included in the imprinting apparatus 100 that is provided separately from the ejection apparatus 10.

The ejection apparatus 10 includes an ejection head 11 that ejects the imprint material 8, a container 12 that contains the imprint material 8, and a pressure controller 13. The container 12 in this example is integrated with the ejection head 11 into a cartridge and is subject to replacement on the cartridge basis. The substrate 4 is placed on a stage 6 and the imprint material 8 is ejected from the ejection head 11 onto the substrate 4. The mold 1 is brought into contact with the imprint material 8 ejected onto the substrate 4. In this state, the imprint material 8 is cured by irradiating the imprint material 8 with ultraviolet rays emitted from an ultraviolet irradiation apparatus 7. A fine uneven pattern or the like is formed on the mold 1. The pattern on the mold 1 is transferred onto the imprint material 8 on the substrate 4 as a consequence of detaching the mold 1 from the imprint material 8. In this way, the pattern is formed on the imprint material 8.

The stage 6 can move on a base frame 5 while retaining the substrate 4. A drive mechanism 2 that vertically drives the mold 1 is held by a structure 3. The mold 1 can be brought into contact with the imprint material 8 by moving the mold 1 downward to come close to the substrate 4. The ultraviolet irradiation apparatus 7 is located above the mold 1. The irradiation apparatus 7 emits ultraviolet light 9 onto the imprint material 8 through the mold 1. A light source in the irradiation apparatus 7 may be a halogen lamp or the like that emits the i-line or the g-line, for example. In the meantime, the irradiation apparatus 7 may also have a function to collect the light emitted from the light source.

In an imprinting operation, the substrate 4 is mounted on the stage 6 to begin with. The stage 6 moves the substrate 4 to a position below the ejection head 11 of the ejection apparatus 10. Then, the imprint material 8 is ejected from the ejection head 11 onto the substrate 4 while moving the stage 6 together with the substrate 4. Next, the stage 6 moves the portion of the substrate 4 to which the imprint material 8 is applied to a position below the mold 1. Thereafter, the mold 1 is brought close to the substrate 4 by moving the mold 1 downward with the drive mechanism 2. Then, relative positions between the mold 1 and the substrate 4 are adjusted by superposing an alignment mark on the mold 1 on an alignment mark on the substrate 4 by using an alignment scope or the like.

Next, the mold 1 is moved further downward with the drive mechanism 2 so as to bring the mold 1 into contact with the imprint material 8. Then, the irradiation apparatus 7 emits the ultraviolet light 9. The ultraviolet light 9 is passed through the mold 1 and projected on the imprint material 8. In consequence, the imprint material 8 is cured by a photo-curing reaction. Thereafter, the mold 1 is detached from the cured imprint material 8 by moving the mold 1 upward with the drive mechanism 2.

The above-described process makes it possible to form a pattern (the patterned imprint material) on the substrate 4. The imprinting apparatus used for semiconductor manufacturing may form such patterns in the entire region on the substrate 4. In this case, the imprinting apparatus repeats the series of the imprinting operation while changing the regions on the substrate 4 to form the patterns.

Figure 1B:
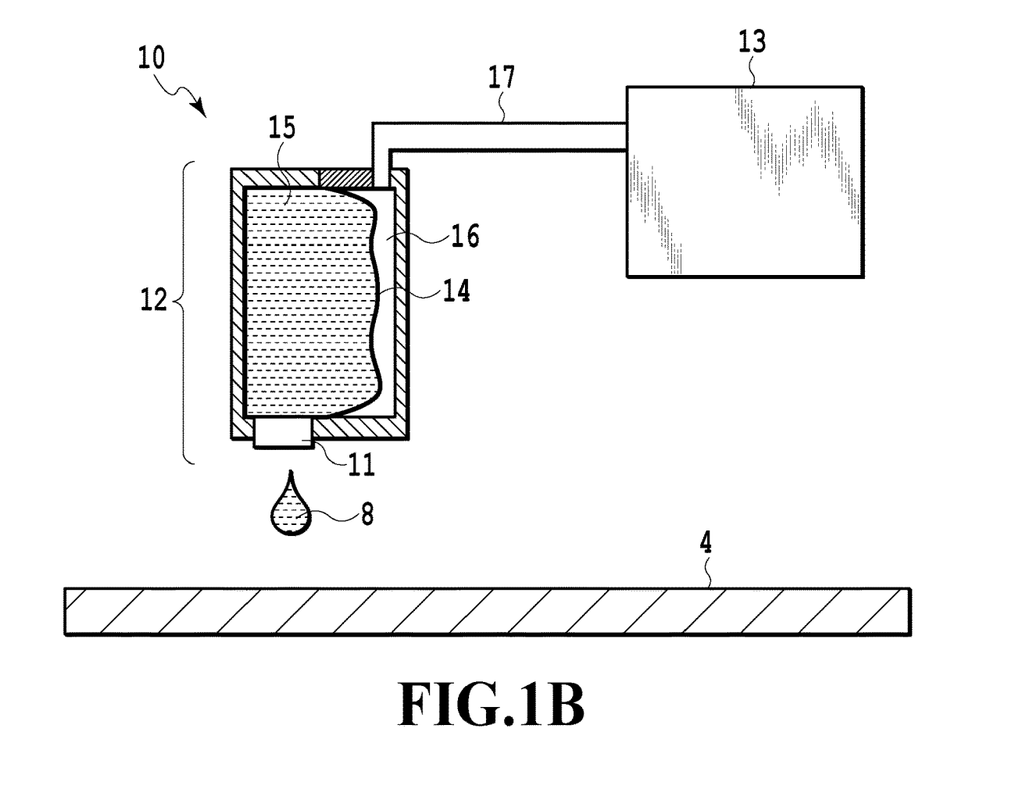

FIG. 1B is an explanatory diagram of the ejection apparatus 10. The ejection apparatus 10 includes the ejection head 11, the container 12, and the pressure controller 13. A separation membrane 14 is provided in the container 12 so as to separate an internal space thereof into a first container 15 and a second container 16. The separation membrane 14 is a membrane that separates the imprint material 8 from an operating fluid (an injection fluid) to be described later. The separation membrane 14 is preferably flexible. The separation membrane 14 preferably has a thickness in a range from 10 μm to 200 μm inclusive. Moreover, the separation membrane 14 is preferably formed from a material having low permeability to liquids and gases. For instance, the separation membrane 14 may be formed from a film made of a fluorine-containing resin such as PFA or a composite multilayer film that combines a fluorine-containing resin and a plastic material. The imprint material 8 is put into the first container 15 that communicates with the ejection head 11.

Figure 2A:
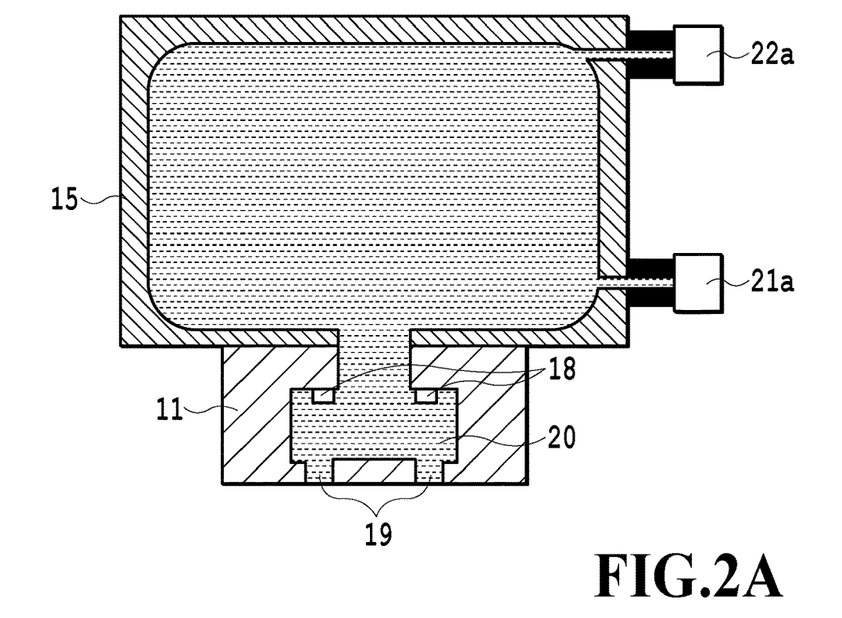
FIG. 2A is an enlarged diagram of an ejection head in FIG. 1B

FIG. 2A is an enlarged diagram of the ejection head 11. The ejection head 11 is provided with ejection energy generating elements 18, and the elements 18 generate ejection energy for ejecting imprint material 8 from ejection ports 19. A piezoelectric element, a heating resistor, or the like can be used as each element 18. Since a material containing a large amount of a resin component is generally used as the imprint material 8, it is preferable to use the piezoelectric element as the element 18. By controlling the element 18 with a not-illustrated controller, the imprint material 8 in a region 20 between the elements 18 and the ejection ports 19 is ejected from the ejection ports 19 and applied onto the substrate 4. The ejection head 11 is preferably a head used as an inkjet printing head and the like. Alternatively, as the ejection head 11, it is also possible to use an ejection head in which supply and stop of a liquid therein is controlled by using a control valve or the like.

The operating fluid (the injection fluid) is injected into the second container 16 that does not communicate with the ejection head 11. The second container 16 communicates with pressure controller 13 through a communication passage 17. The pressure controller 13 includes a tank, a pipe, a pressure sensor, a pump, a valve, and the like which are not illustrated. The pressure controller 13 can control a pressure of the imprint material 8 in the first container 15 through the separation membrane 14 by controlling a pressure of the operating fluid in the second container 16 while using the pressure sensor, the pump, and the valve. This makes it possible to supply the imprint material 8 at a predetermined pressure to the ejection head 11, to stabilize a shape of a gas-liquid interface (a meniscus) of the imprint material 8 in the ejection head 11 and thus to eject the imprint material 8 successfully.

By repeating the ejection of the imprint material 8 from the ejection head 11, the imprint material 8 in the first container 15 is consumed and reduced whereby the separation membrane 14 is deformed in a direction toward the first container 15 accordingly. Along with the above-mentioned deformation of the separation membrane 14, the pressure controller 13 replenishes the second container 16 with the operating fluid in the unillustrated tank, thereby maintaining the pressure of the imprint material 8 in the first container 15 at a predetermined pressure.

The imprint material 8 is required to eliminate foreign substances (particulates) and metal ions as much as possible and to retain its properties until the imprint material 8 is applied to the substrate 4. In this embodiment, the first container 15 can store the imprint material 8 in a state isolated from the outside for a period until the imprint material 8 in the first container 15 is used up. In other words, the imprint material 8 can be isolated from the outside for a period until the capacity of the first container 15 is reduced along with the deformation of the separation membrane 14 and the imprint material 8 in the first container 15 is eventually used up. Accordingly, it is possible to avoid entry of foreign substances into the imprint material 8 and an increase in metal ions therein by keeping the outside air and instruments such as the pressure sensor from coming into contact with the imprint material 8. The mode of containing the imprint material 8 and the mode of controlling the pressure of the imprint material 8 are not limited to those described in this embodiment. For example, the pressure of the imprint material 8 may be controlled without using the operating fluid.

In the field of inkjet printing apparatuses, the inside of a printing head (ejection head) is kept at a negative pressure in a certain range in order to stabilize a shape of a meniscus of an ink formed at each ejection port of the printing head for ejecting the ink. For example, a container for containing the ink to be supplied to the printing head is provided with a porous body so as to hold the ink in the porous body, and capillary force inside the porous body is used to apply the negative pressure to the ink in the container. Besides, there are also a method of applying the negative pressure to the ink in the container by combining a mechanical element such as a spring with a balloon-shaped membrane, and a method of controlling the negative pressure of the ink in the container by using a control valve and an air pressure. These methods are also applicable to this embodiment in order to control the imprint material 8 in the container at the negative pressure.

Figure 2B:
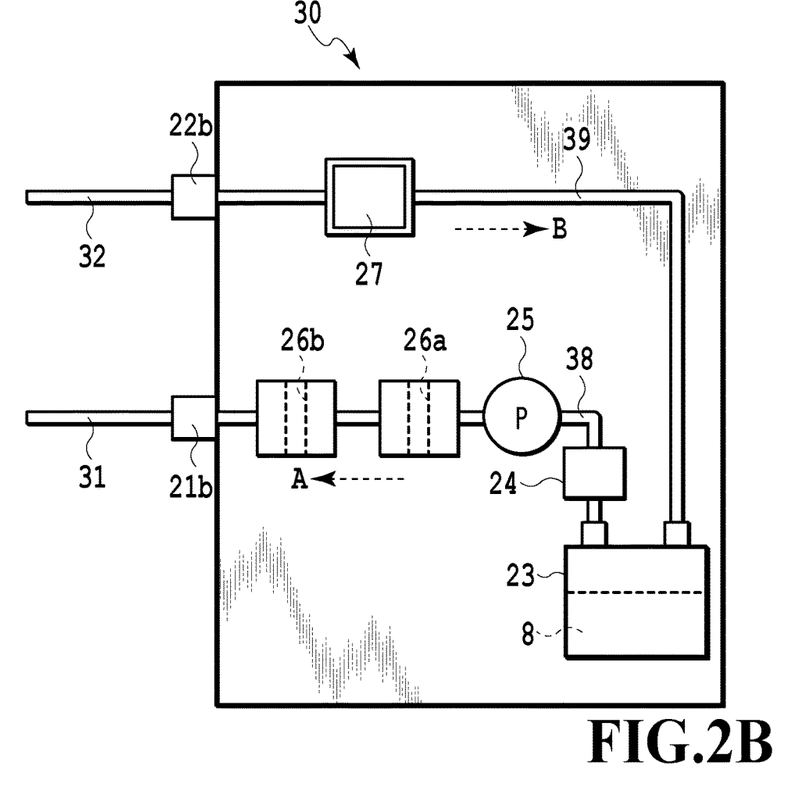
FIG. 2B is an explanatory diagram of an injection apparatus to be connected to the ejection apparatus.

FIG. 2B is an explanatory diagram of an injection apparatus 30 for injecting the imprint material 8 into the first container 15. The injection apparatus 30 is provided with a connection port (a connecting port) 21b connectable to an inlet port (a connected port) 21a of the first container 15, and a connection port (a connecting port) 22b connectable to an inlet port (a connected port) 22a of the first container 15. As shown in FIG. 2A, in the orientation in which the ejection head 11 is located below the first container 15 in a direction of gravitational force, the inlet port 21a communicates with a lower inner part of the first container 15 while the inlet port 22a communicates with an upper inner part of the first container 15. When the imprint material 8 is injected into the first container 15, the connection port 21b is connected to the inlet port 21a through a pipe 31 and the connection port 22b is connected to the inlet port 22a through a pipe 32.

The injection apparatus 30 includes a tank 23 to contain the imprint material 8. The tank 23 is connected to the connection port 21b through a pipe 38 and is also connected to the connection port 22b through a pipe 39. The pipe 38 is equipped with a pump 25 that pumps the imprint material 8 in the tank 23 in a direction of an arrow A toward the inlet port 21a, and filters 26a and 26b that remove foreign substances contained in the imprint material 8. A pore size of the filter 26b is preferably smaller than that of the filter 26a located on an upstream side of the filter 26b in the direction of the arrow A. Given the potential for entry of the foreign substances into the imprint material 8 due to dust emitted from the pump 25, the filters 26a and 26b are preferably located on a downstream side of the pump 25 in the direction of the arrow A.

The respective constituents in the injection apparatus 30 are connected by using pipes (inclusive of the pipes 38 and 39) such as resin tubes. As for the material of flow passage forming members inclusive of those pipes is preferably a material such as a fluorine-containing resin having solvent resistance to the imprint material 8. In the meantime, the flow passage for the imprint material 8 in the injection apparatus 30 is subjected to acid washing before being connected to the container 12 whereby metal ions adhering to the inside of the flow passage are removed. The injection apparatus 30 is provided with a deaerator 24 that removes bubbles in the imprint material 8 and inside the flow passage, and a particle counter 27 that detects and counts foreign substances (inclusive of the bubbles) contained in the imprint material 8. Given the potential for entry of the foreign substances from the deaerator 24 into the imprint material 8, the filter 26a is preferably located on a downstream side of the deaerator 24 in the direction of the arrow A.

By connecting the connection port 21b to the connection port 22b in a short-circuit fashion by using a not-illustrated pipe or the like, the injection apparatus 30 can circulate the imprint material 8 contained in the tank 23 in the direction of the arrow A as well as a direction of an arrow B and thus filtrate the imprint material 8 (internal circulation filtration). A degree of cleanness of the imprint material 8 in the injection apparatus 30 can be monitored by constantly counting the number of the foreign substances (inclusive of the bubbles) contained per unit quantity of the imprint material 8 by using the particle counter 27. The deaerator 24 also has an effect of preventing the particle counter 27 from erroneously detecting certain bubbles (nanobubbles) contained in the imprint material 8 as the foreign substances. The injection apparatus 30 may also be provided with components including a pressure gauge, a flowmeter, a valve, a metal ion removal filter for removing the metal ions contained in the imprint material 8, and the like. In this case, these components are located on the upstream side of the filter 26a in the direction of the arrow A, and the foreign substances originated from those components and potentially entering the imprint material 8 are removed with the filter. Thus, it is possible to prevent the entry of the foreign substances from the injection apparatus 30 into the first container.

The imprint material 8 to be injected into the first container 15 of the ejection apparatus 10 preferably has the high degree of cleanness by removing the foreign substances and the metal ions contained in the imprint material 8 in advance. The imprint material 8 may be subjected to the internal circulation (the internal circulation filtration) in the injection apparatus 30 by connecting the connection port 21*b* of the injection apparatus 30 to the connection port 22*b* thereof in a short-circuit fashion as described previously before the injection apparatus 30 is connected to the first container 15. In this instance, the number of the foreign substances (inclusive of the bubbles) contained in the imprint material 8 may be counted with the particle counter 27 located on a downstream side of the connection port 22*b* in the direction of the arrow B, and the internal circulation filtration may be continued until the counted number falls to or below a predetermined number. Then, after the number of the foreign substances contained in the imprint material 8 falls to or below the predetermined number, the injection of the imprint material 8 is conducted by connecting the injection apparatus 30 to the first container 15 by using the pipes 31 and 32.

The inside of the first container 15 is cleaned with a chemical agent such as an acid, an alkali, and a solvent, thereby removing the metal ions and the foreign substances in advance. After the cleaning of the first container 15 as mentioned above, the inlet ports 21*a* and 22*a* are confined so as to be blocked off from an external space, and the confined state is maintained until right before the injection of the imprint material 8.

Figure 3A:
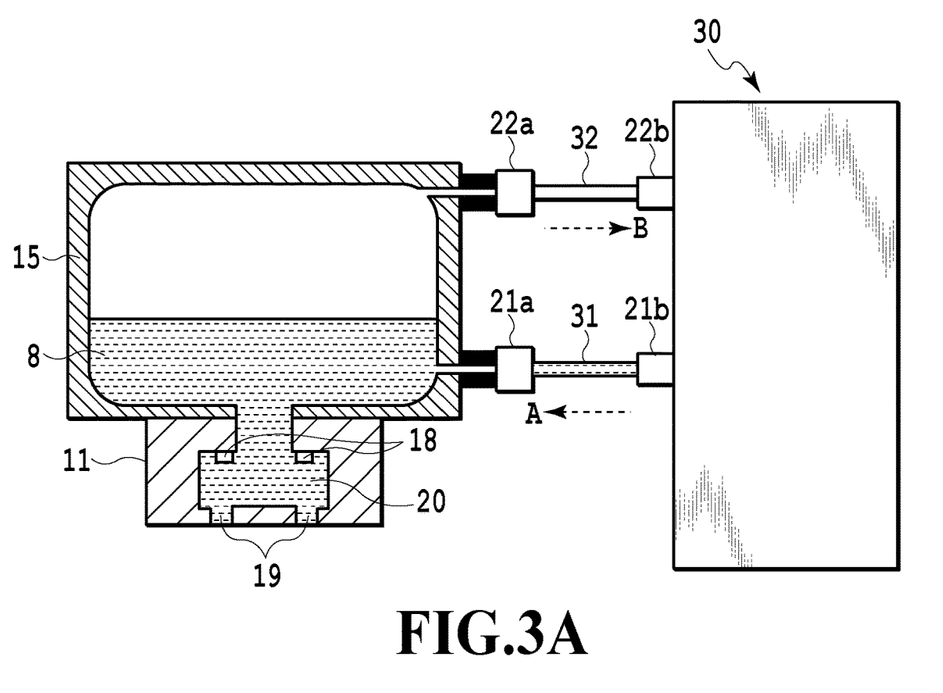
FIGS. 3A and 3B are explanatory diagrams of an injecting step in an injecting method according to a first embodiment of the present invention, respectively.

When the imprint material 8 is injected into the first container 15, the orientation of the container 12 is controlled as shown in FIG. 3A in such a way as to locate the ejection head 11 below the first container 15 in the direction of the gravitational force. Since the container 12 of this example is integrated with the ejection head 11 into the cartridge, the orientation of the cartridge is controlled in such a way as to locate the ejection head 11 below in the direction of the gravitational force. Then, the connection ports 21*b* and 22*b* of the injection apparatus 30 are connected to the inlet ports 21*a* and 22*a* by using the pipes 31 and 32, respectively, and the imprint material 8 is injected (introduced) into the first container 15 from the inlet port 21*a* by using the pump 25 of the injection apparatus 30. Along with the injection of imprint material 8 into the first container 15, a gas (air) present in the first container 15 is discharged (withdrawn) in the direction of the arrow B from the inlet port 22*a*.

Figure 3B:
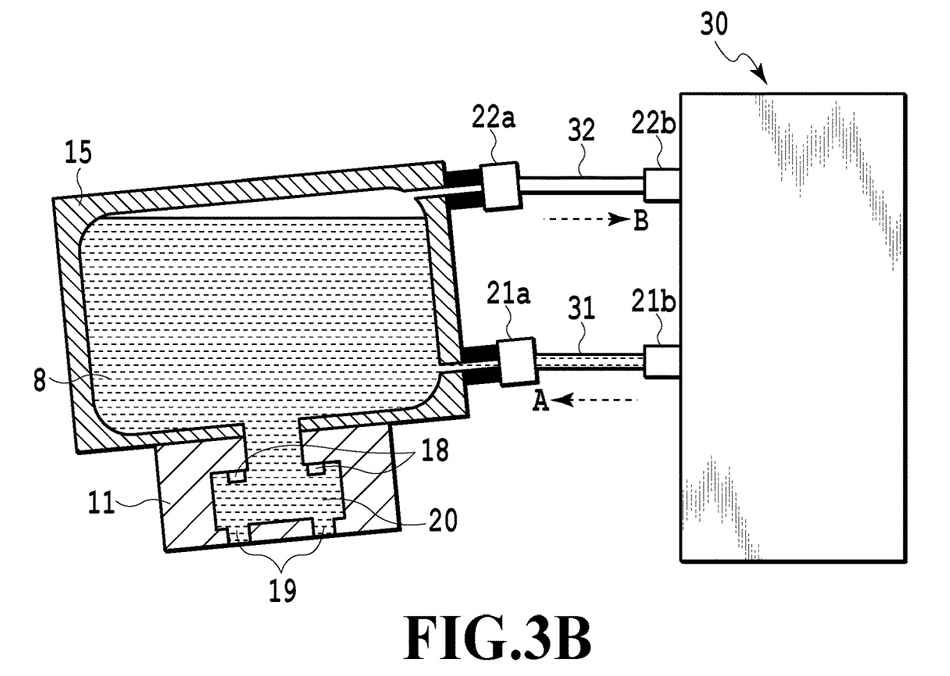

If there is the gas-liquid interface between the imprint material 8 and the gas in the first container 15 after the completion of injection of the imprint material 8, there are concerns about foaming of the imprint material 8 originating from the gas-liquid interface and entry of the gas from the gas-liquid interface into the imprint material 8. When there are a lot of bubbles contained in the imprint material 8, the bubbles may potentially clog nozzles in the ejection head 11, thereby hindering normal ejection of the imprint material 8. In this regard, when an amount of injection of the imprint material 8 into the first container 15 reaches a predetermined amount, the cartridge is tilted as shown in FIG. 3B such that a position of a portion in the first container 15 close to the inlet port 22*a* becomes higher and the injection of the imprint material 8 is continued while keeping the tilted orientation. By tilting the cartridge as described above, a liquid level of the imprint material 8 injected into the first container 15 becomes higher and the gas (the air) remaining in the first container 15 moves toward the inlet port 22*a* along the tilt inside the first container 15 accordingly. As a consequence, it is possible to easily discharge the gas present in the first container 15 from the inlet port 22*a* and to reduce the amount of the gas remaining in the first container 15.

After the injection of the imprint material 8 into the first container 15 is completed, the number of the foreign substances (inclusive of the bubbles) in the imprint material 8 is counted with the particle counter 27 of the injection apparatus 30. By connecting the first container 15 to the injection apparatus 30 with the pipes 31 and 32, the imprint material 8 injected into the first container 15 can be circulated and filtrated through the injection apparatus 30. Moreover, it is also possible to count the foreign substances in the imprint material 8 that is discharged from the inlet port 22*a*. The circulation and filtration of the imprint material 8 injected into the first container 15 is carried out until the amount of the foreign substances in the imprint material 8 falls to or below a predetermined amount. The amount of the foreign substances contained in at least one of a portion of the imprint material 8 in the first container 15 and a portion of the imprint material 8 in the pipes 31 and 32 is detected, and the inside of the pipes (the inside of the pipes 31 and 32) is blocked as described later on the condition that the amount of the foreign substances falls to or below the predetermined amount.

Figure 4A:
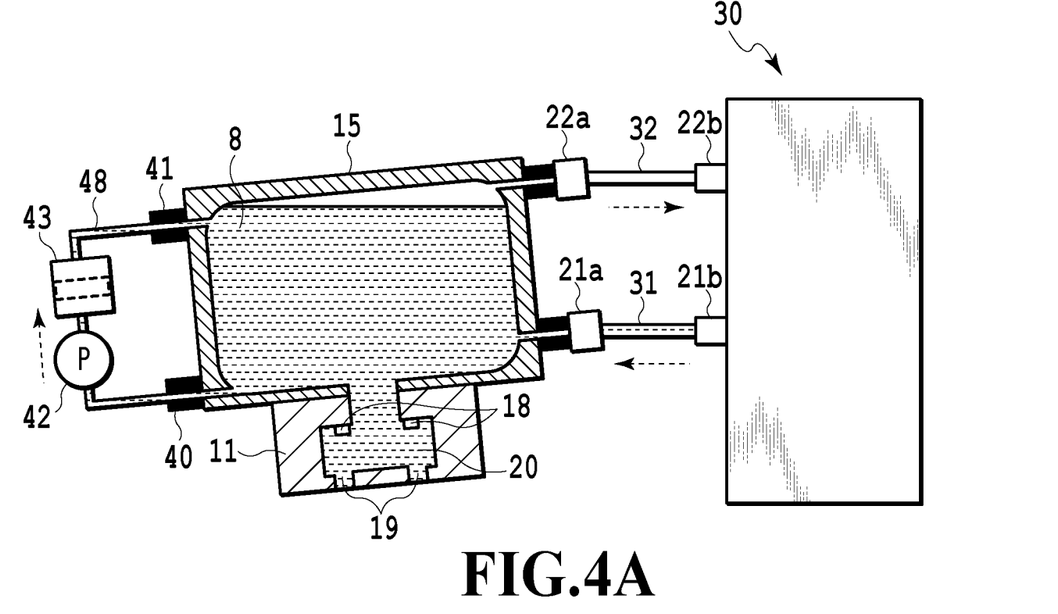
FIGS. 4A and 4B are explanatory diagrams showing different configuration examples, respectively, in which a passage for an imprint material is connected to outside of a first container in FIG. 3A.

The ejection apparatus 10 may also be configured to arrange a filter on a passage provided outside the first container 15. For example, a flow passage forming member 48 to form a passage is connected to the first container 15 in the ejection apparatus 10 as shown in FIG. 4A. The flow passage forming member 48 is a member that forms a passage for the imprint material 8 and communicates with the first container 15 through a first opening 40 and a second opening 41 provided to the first container 15. The first opening 40 is an opening for supplying the imprint material 8 in the first container 15 into the passage while the second opening 41 is an opening for discharging the imprint material 8, which is supplied from the first opening 40 into the passage, to the first container 15. A pump 42 and a filter 43 that is configured to filtrate the imprint material 8 are arranged on the passage formed between the first opening 40 and the second opening 41 by using the flow passage forming member 48. Given the potential for entry of foreign substances into the imprint material 8 due to dust emitted from the pump 42, the filter 43 is preferably disposed at a position on a downstream side in a case where the imprint material 8 is fed from the first opening 40 to the second opening 41. Though the pump 42 is preferably provided inside the passage that is formed from the flow passage forming member 48, the pump 42 may be provided outside the passage instead.

When the pump 42 is driven, the imprint material 8 contained in the first container 15 is supplied (aspirated) from the first opening 40 into the passage. The imprint material 8 supplied from the first opening 40 into the passage is passed through the filter 43 inside the passage and filtrated. Then, the imprint material 8 is returned into the first container 15 through the second opening 41. Thus, the imprint material 8 is circulated and filtrated through the passage outside the first container 15.

When the imprint material 8 is injected into the first container 15 in FIG. 4A, the imprint material 8 also needs to be injected into the pump 42, the filter 43 and the like so as to prevent the air from remaining in the container 15. Accordingly, it is preferable to drive the pump 42 when injecting the imprint material 8 into the container 15. The air present inside the pump 42, the filter 43, and the like at an initial stage is replaced with the imprint material 8 by driving the pump 42, and is discharged from the second opening 41 into the first container 15. By tilting the cartridge at the time of injection of the imprint material 8 as mentioned above, the gas discharged from the second opening 41 into the first container 15 moves toward the inlet port 22a along the tilt inside the first container 15, and is easily discharged from the inlet port 22a.

Figure 4B:
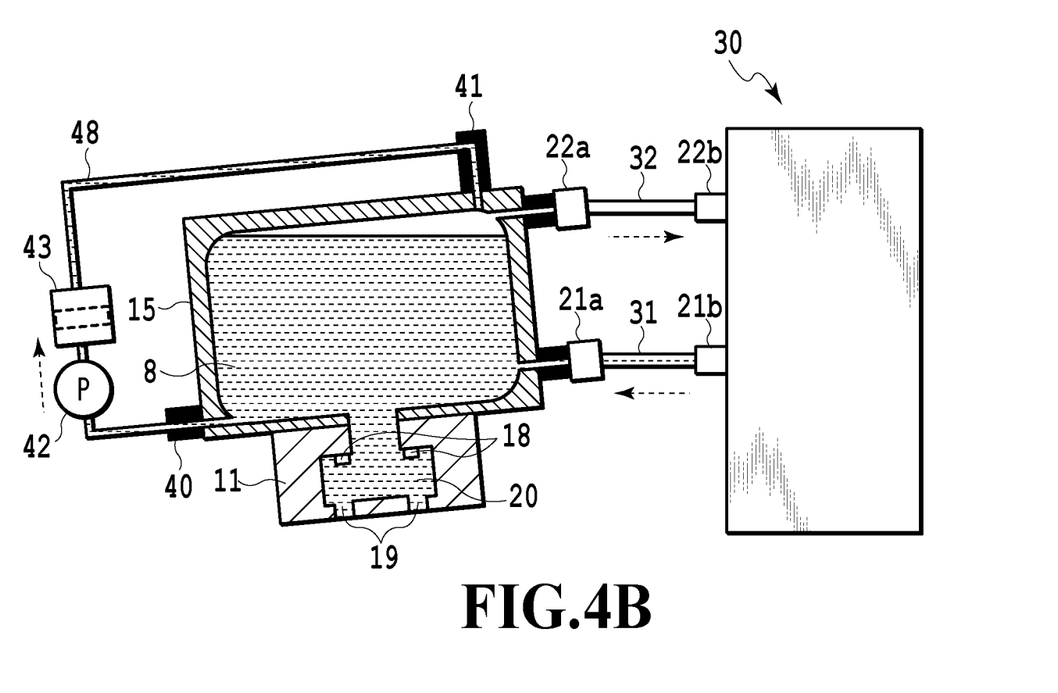

Alternatively, the second opening 41 may communicate with the inlet port 22a as shown in FIG. 4B. In this way, the gas discharged from the second opening 41 into the first container 15 is discharged from the inlet port 22a without being passed through the first container 15. Any of the configurations illustrated in FIG. 4A and FIG. 4B can reduce the amount of the gas remaining in the first container 15 at the time of the process to inject the imprint material 8.

After the injection of the imprint material 8 into the first container 15 is completed, the imprint material 8 is circulated and filtrated through the injection apparatus 30. However, a material (a liquid) having high viscosity such as the imprint material 8 is hard to agitate. For this reason, a portion of the imprint material 8 between the inlet port 22a and the inlet port 21a is circulated and filtrated easily through the injection apparatus 30 whereas a portion of the imprint material 8 located away from the inlet ports 22a and 21a is not circulated and filtered easily. As a consequence, a portion of the imprint material 8 in the first container 15 is slowly replaced with the circulated and filtrated portion of imprint material 8 from a region in the vicinity of the inlet ports 22a and 21a. Accordingly, the flow of the imprint material 8 is actively generated in the first container 15 by driving the pump 42 in the passage formed from the flow passage forming member 48. This makes it possible to inhibit the imprint material 8 from remaining in the first container 15 and to subject the overall imprint material 8 in the first container 15 inclusive of the portion at the location away from the inlet ports 21a and 22a to the circulation and filtration efficiently. An amount of the liquid sent by the pump 42 and timing to drive the pump 42 need not be set as the same as those applicable to the pump 25 provided to the injection apparatus 30. Such an amount and timing may be selected so as to achieve the circulation and filtration to reduce the amount of the foreign substances in the imprint material 8 equal to or below the predetermined amount in a short time.

Figure 5A:
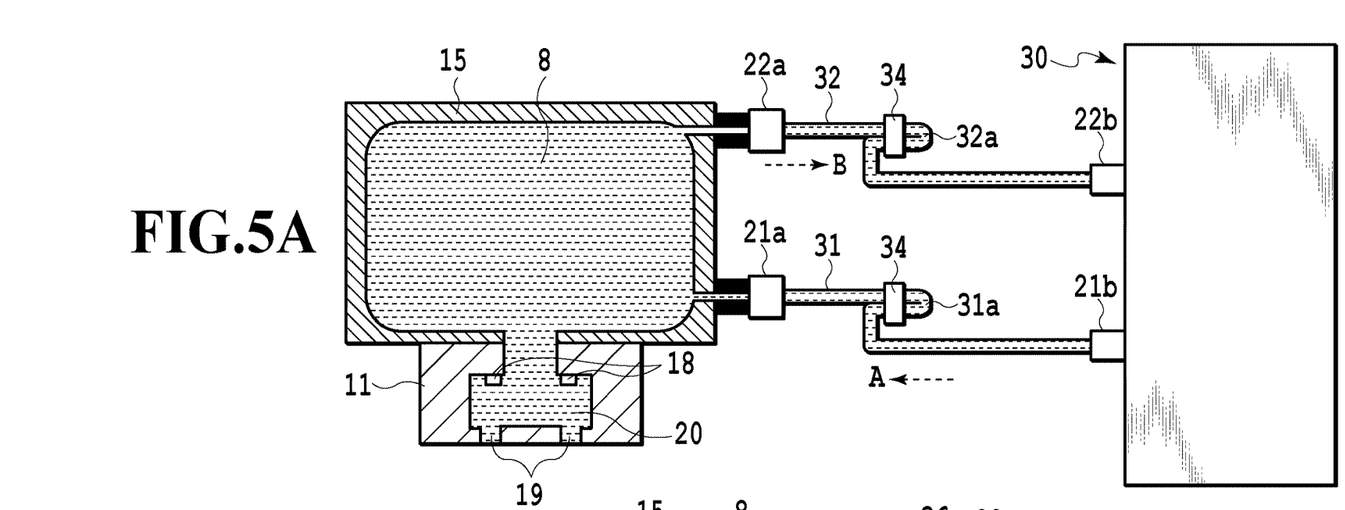
FIG. 5A is an explanatory diagram of a blocking step and a cutting step in the injecting method according to the first embodiment of the present invention and FIG. 5B is an explanatory diagram of a protection covering that covers pipes after the cutting step in FIG. 5A.

After the injection of the imprint material 8 into the first container 15, the pipe 31 is blocked by bending (deforming) the pipe 31 with application of external force to part of the pipe 31 as shown in FIG. 5A. Thus, the flow passage from the connection port 21b to the inlet port 21a is blocked off. Such a bent part (a blocked part) 31a of the pipe 31 only needs to be provided at least at one location, or may be provided at two or more locations. After bending and blocking the pipe 31, a bent state (a blocked state) of the bent part 31a is stabilized by using a clamp member (a fixture member) 34 so as not to release the bent part 31a. The clamp member 34 of this example draws front and rear portions of the bent part 31a and fixes these portions together such that the portions are arranged parallel to each other. The clamp member 34 only needs to be able to maintain the blocked state of the flow passage with the bent part 31a and a configuration of the clamp member 34 is not limited. Meanwhile, in this example, the pipe 31 is partially blocked by bending the pipe 31. Instead, the pipe 31 may be partially blocked by squashing the pipe 31. As for the material of the pipes 31 and 32, it is possible to use a fluorine-containing resin or the like which has solvent resistance to the imprint material 8.

Next, as with the pipe 31, the flow passage inside the pipe 32 is blocked by partially bending the pipe 32. Such a bent part 32a of the pipe 32 only needs to be provided at least at one location, or may be provided at two or more locations. As with the pipe 31, a bent state of the bent part 32a is stabilized by using another clamp member 34 so as not to release the bent part 32a.

By blocking the pipe 31 before blocking the pipe 32, it is possible to prevent a back-flow of the imprint material 8 which may occur in a case of blocking the pipe 32 in advance. If the pipe 32 is blocked before blocking the pipe 31, the imprint material 8 injected into the first container 15 may flow back to the injection apparatus 30 through the pipe 31 on a lower side in the direction of the gravitational force. By blocking the pipes 31 and 32, the flow passage from the connection port 21b to the inlet port 21a and the flow passage from the inlet port 22a to the connection port 22b are blocked off, whereby the communication between the injection apparatus 30 and the first container 15 is disconnected. In the meantime, a pressure inside the first container 15 is kept at such a pressure that does not break the gas-liquid interface (the meniscus) at each of the ejection ports 19 of the ejection head 11, or at 1 kPa or below, for example.

After blocking the pipes 31 and 32 as described above, a portion of the pipe 31 located on an upstream side of the bent part 31a in the direction of the arrow A is cut off. Such a cut-off part of the pipe 31 is situated between the connection port 21b and a portion of the clamp member 34 located on the upstream side of the bent part 31a in the direction of the arrow A. The pipe 32 is cut off after cutting the pipe 31 off, and a cut-off part of the pipe 32 is set between the connection port 22b and a portion of the clamp member 34 located on a downstream side of the bent part 32a in the direction of the arrow B. A surface of a tool used for cutting off the pipes 31 and 32 is preferably formed from a material other than a metal. For instance, the surface of the tool is coated with a fluorine-containing resin and then subjected to an acid washing treatment. The use of the cutting tool treated as described above makes it possible to prevent metal contamination of the imprint material 8.

Figure 5B:
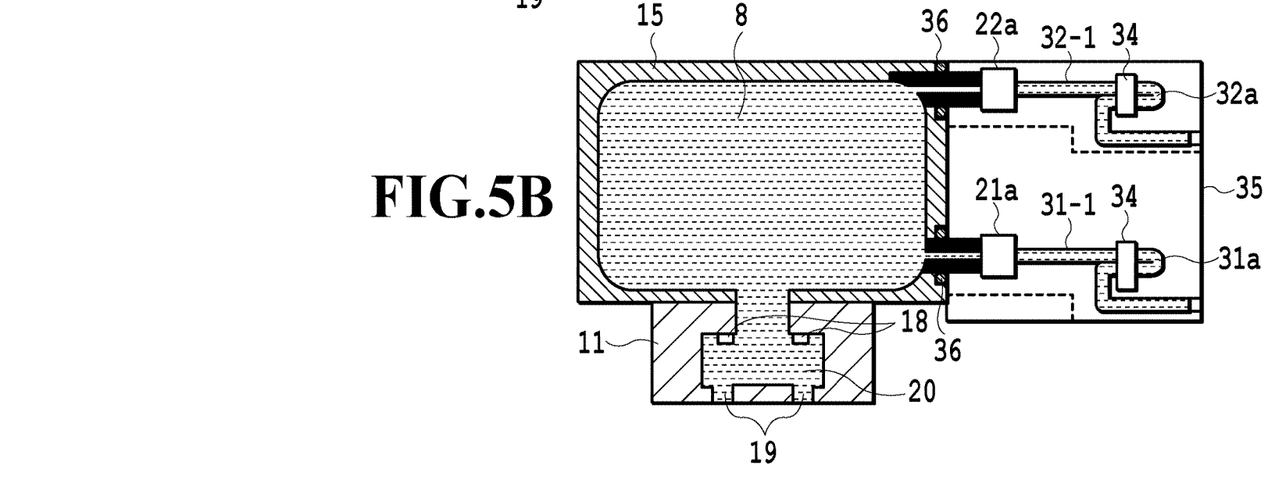

After the ejection apparatus 10 is separated from the injection apparatus 30 by cutting off the pipes 31 and 32, portions (first portions) 31-1 and 32-1 of the pipes 31 and 32 that remain connected to the first container 15 may be covered with a protection covering 35 as shown in FIG. 5B. The pipes 31 and 32 are cut off such that the bent parts 31a and 32a are included in the portions 31-1 and 32-1. The protection covering 35 is provided with a control part that controls positions of the portions 31-1 and 32-1. In this way, it is possible to suppress vibration of the portions 31-1 and 32-1 including the bent parts 31a and 32a as well as the clamp members 34 when driving the ejection apparatus 10, and to suppress generation of the foreign substances inside and outside the pipes 31 and 32 as a consequence. Moreover, in case of occurrence of an unexpected leakage of the imprint material 8 from the portions 31-1 and 32-1, sealing portions 36 such as O-rings are interposed between bonding surfaces of the first container 15 and the protection covering 35 so as to avoid the leakage of the imprint material 8 to the outside, whereby the inside of the protection covering 35 is hermetically sealed. Thus, even if the imprint material 8 leaks out of the portions 31-1 and 32-1, the imprint material 8 can be kept from leaking out of the protection covering 35.

Meanwhile, at the time of occurrence of such a leakage, it is possible to minimize downtime of the imprinting apparatus by replacing the cartridge including the ejection head 11 and the container 12.

According to this embodiment, at the time of attachment and detachment of the pipes 31 and 32 between the ejection apparatus 10 and the injection apparatus 30, it is possible to prevent the foreign substances, which may be generated by friction associated with the attachment and detachment, from entering the pipes 31 and 32. Moreover, entry of foreign substances and metal ions floating in the external space can also be prevented when openings of the pipes 31 and 32 establish communication with the external space. As a consequence, it is possible to prevent contamination of and entry of the foreign substances into the imprint material 8 that is injected into the first container 15, and thus to contain the imprint material 8 while retaining the degree of cleanness thereof.

Second Embodiment

Figure 6A:
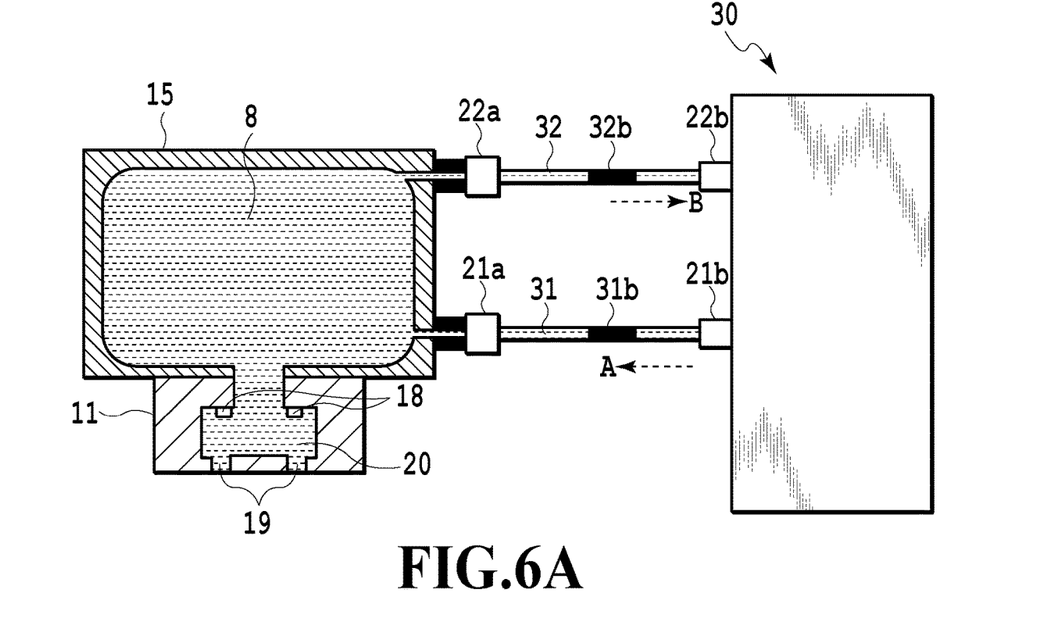
FIG. 6A is an explanatory diagram of a blocking step in an injecting method according to a second embodiment of the present invention and FIG. 6B is an explanatory diagram of a cutting step following the blocking step in FIG. 6A.

In this embodiment, midstream parts of the pipes 31 and 32 are welded by using heat or the like as shown in FIG. 6A after the imprint material 8 is injected into the first container 15, and the pipes 31 and 32 are blocked by such welded parts (blocked parts) 31b and 32b. As in the case of the first embodiment where the pipe 31 is blocked first and the pipe 32 is blocked thereafter, the welded part 31b is formed first and then the welded part 32b is formed thereafter. By blocking the pipes 31 and 32, the flow passage from the connection port 21b to the inlet port 21a and the flow passage from the inlet port 22a to the connection port 22b are blocked off, whereby the communication between the injection apparatus 30 and the first container 15 is disconnected. Each of the welded parts 31b and 32b has a sufficient length for blocking the corresponding pipe 31 or 32.

Figure 6B:
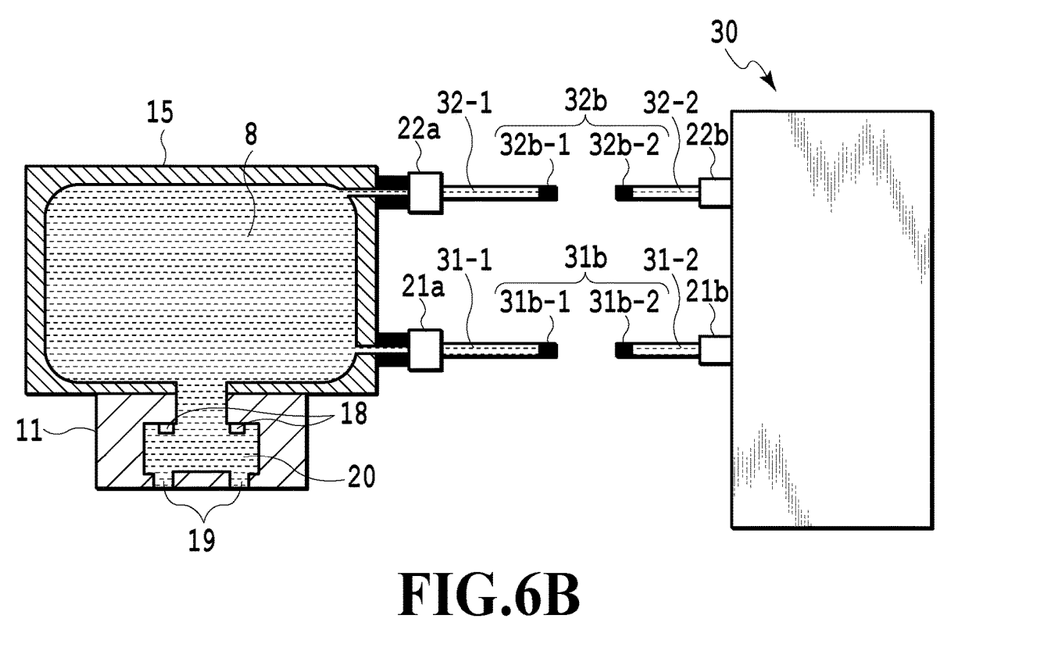

After the pipes 31 and 32 are blocked, the pipes 31 and 32 are cut off at the welded parts 31b and 32b as shown in FIG. 6B. The welded part 31b may be cut off first and the welded part 32b may be cut off thereafter. After cutting off the welded part 31b, the pipe 31 is divided into a portion (a first portion) 31-1 on the first container 15 side and a portion (a second portion) 31-2 on the injection apparatus 30 side. Likewise, after cutting off the welded part 32b, the pipe 32 is divided into a portion (a first portion) 32-1 on the first container 15 side and a portion (a second portion) 32-2 on the injection apparatus 30 side. The pipes 31 and 32 are cut off such that the portions 31-1 and 32-1 include the welded parts 31b and 32b, respectively. In this example, the pipes 31 and 32 are cut off such that the portions 31-2 and 32-2 also include the welded parts 31b and 32b, respectively. Specifically, the pipes 31 and 32 are cut off at the welded parts 31b and 32b such that portions 31b-1 and 32b-1 of the welded parts 31b and 32b are included in the portions 31-1 and 32-1 and other portions of the welded parts 31b-2 and 32b-2 are included in the portions 31-2 and 32-2. Since every cut-off part of the pipes 31 and 32 is provided with the welded part, it is possible to separate the ejection apparatus 10 from the injection apparatus 30 by cutting off the pipes 31 and 32 without causing the leakage of the imprint material 8.

The portions 31-1 and 32-1 of the pipes 31 and 32 that remain on the first container 15 side may be covered with the protection covering 35 as with the above-described first embodiment.

Third Embodiment

In this embodiment, the imprint material 8 in the pipes 31 and 32 that connect the first container 15 to the injection apparatus 30 is partially cured in order to block the pipes 31 and 32.

A mode of the process to cure the imprint material 8 is selected depending on the type of the imprint material 8. For example, when the imprint material 8 is made of the ultraviolet curable resin, the pipes 31 and 32 are partially irradiated with ultraviolet rays to cure the imprint material 8 at the corresponding portions, and the pipes 31 and 32 are blocked with the cured portions of the imprint material 8. Meanwhile, when the imprint material 8 is made of the thermosetting resin, the pipes 31 and 32 are partially heated to cure the imprint material 8 at the corresponding portions, and the pipes 31 and 32 are blocked with the cured portions of the imprint material 8. By curing the imprint material 8 as described above, it is possible to block the pipes 31 and 32 and to confine the imprint material 8 injected into the first container 15. Thereafter, the ejection apparatus 10 and the injection apparatus 30 can be separated from each other by cutting off the cured portions of the imprint material 8.

Fourth Embodiment

In the imprinting apparatus of each of the aforementioned embodiments, the uneven pattern formed in advance on the mold 1 is transferred to the substrate 4 such as a wafer. In the third embodiment of the present invention, however, no uneven pattern is formed on the mold 1.

A foundation pattern on the wafer as the substrate 4 generally has a uneven profile attributed to a pattern formed in a preceding process. In particular, there is also a wafer having a difference in level around 100 nm with the progress in multilayer structures of memory devices in recent years. A difference in level attributable to a gentle curve of such a wafer as a whole can be corrected by using a focus tracking function of a scanning exposure apparatus used in a photolithographic process on the wafer. Nonetheless, fine-pitch evenness within an exposure slit area of the exposure apparatus directly affects depth of focus (DOF) of the exposure apparatus. Examples of a mode to planarize the foundation pattern of the wafer include methods of forming a planarized layer as represented by spin on carbon (SOC), chemical mechanical polishing (CMP), and so forth. However, regarding a boundary portion between an isolated pattern area A and a repeated pattern (dense pattern) area B provided with dense lines and spaces in a foundation pattern P on a wafer W as shown in part (a) of FIG. 7, it is difficult to achieve a sufficient planarization effect with an evenness suppression rate in a range from 40% to 70%. Such a difference in evenness of the foundation pattern P tends to increase along with the further progress in multilayer structures of memory devices and the like in the future.

U.S. Pat. No. 9,415,418 describes a method of forming a contiguous film by coating a resist constituting a planarization layer by using an inkjet dispenser, and stamping with a flat-surface template. Meanwhile, U.S. Pat. No. 8,394,282 describes a method of reflecting a result of measurement of topography on a wafer side to density information on each position subject to a coating instruction with an inkjet dispenser.

This embodiment is an example of the present invention to be applied in particular to a planarization processing (planarizing) apparatus that conducts local planarization in a wafer plane by pressing a flat-surface template against an uncured resist coated in advance.

Figure 7:
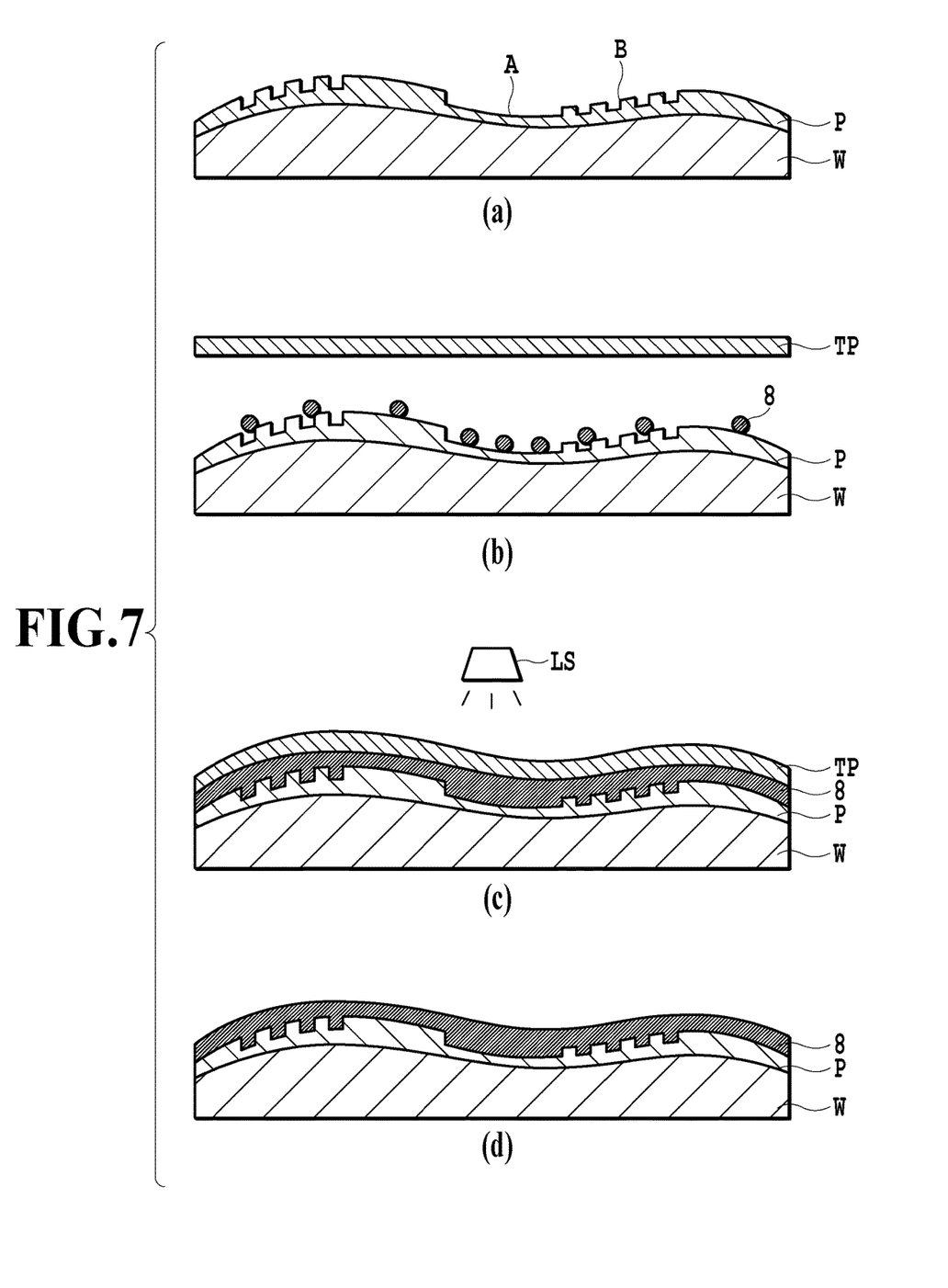
FIG. 7 shows cross-sectional views of a wafer to be processed in a fourth embodiment of the present invention, in which part (a) shows a state of the wafer before a planarization process, part (b) shows a state of coating the wafer with a resin, part (c) shows a state of the wafer at the time of the planarization process, and part (d) shows a state of the wafer after the planarization process.

Part (a) of FIG. 7 is a cross-sectional view of the wafer W before being subjected to a planarization process. In the isolated pattern area A within the foundation pattern P, the area occupied by convex portions in the pattern is small. In the repeated pattern area B within the foundation pattern P, a ratio between the area occupied by convex portions in the pattern and the area occupied by concave portions in the pattern is 1:1. Average heights of the pattern in the areas A and B vary depending on the ratio of the convex portions in the pattern.

Part (b) of FIG. 7 shows a state of coating the wafer W with a resin (a resist) 8 as the imprint material for forming the planarization layer. In part (b) of FIG. 7, the resist 8 is coated with an inkjet dispenser as described in Japanese Patent No. 5761334. However, the method of coating the resist 8 is not limited and a spin coater may be used, for example. The uncured resist 8 coated in advance as described above is pressed with a flat-surface template TP and thus planarized as shown in part (c) of FIG. 7. The present invention is applicable to an imprinting apparatus configured to involve the above-mentioned planarization process. The flat-surface template TP is made of glass or quartz which transmits ultraviolet rays. The resist 8 is cured by being irradiated with exposure light from an exposure light source LS as shown in part (c) of FIG. 7. The flat-surface template TP is designed to follow a concavo-convex profile of the wafer W which is smooth as a whole. Then, the flat-surface template TP is pulled away after the resist 8 is cured as shown in part (d) of FIG. 7.

As with the embodiments described earlier, this embodiment is also capable of collecting the operating fluid for adjusting the pressure of the resist in the tank back into the main tank.

(Method of Manufacturing Article)

A method of manufacturing a device as an article (such as a semiconductor integrated circuit device, a liquid crystal display device, and an MEMS) includes a step of transferring a pattern onto (forming a pattern on) a substrate (such as a wafer, a glass plate, and a film-like substrate) by using the above-described imprinting apparatus. The manufacturing method may further include a step of etching the substrate to which the pattern is transferred. In the case of manufacturing an article such as a patterned medium (a printing medium) and an optical element, a manufacturing method applicable thereto may include other processing steps of processing the substrate to which the pattern is transferred instead of the aforementioned etching step.

Other Embodiments

The present invention is widely applicable as an ejection-material injecting method for injecting various ejection materials each being either a liquid or in liquid form other than the imprint material, and as an ejection-material ejection apparatus capable of ejecting various ejection materials each being either a liquid or in liquid form from an ejection head other than the imprint material ejection apparatus configured to eject the imprint material. Meanwhile, the container to contain the ejection material is not limited to the structure that includes two containing spaces separated by a flexible member. In the meantime, the number of the pipes used to inject the ejection material into the container is not limited to two pipes. In this context, only one pipe may be provided or three or more pipes may be provided. When only one pipe is provided, then the gas (the air) in the container may be discharged to the outside.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-076100, filed Apr. 11, 2018, and No. 2018-241285, filed Dec. 25, 2018, which are hereby incorporated by reference wherein in their entirety.

What is claimed is:

1. An ejection-material injecting method of injecting an ejection material into a container in an ejection apparatus capable of ejecting the ejection material in the container from an ejection head, comprising:
   a connecting step of connecting the container and a tank configured to contain the ejection material to each other by using a pipe;
   an injecting step of injecting the ejection material in the tank into the container through the pipe;
   a blocking step of blocking the pipe in a state of being connected between the tank and the container after the injecting step; and
   a cutting step of cutting off the pipe after the blocking step such that the pipe is separated into a first portion connected to the container and a second portion connected to the tank, and that a blocked part of the pipe blocked in the blocking step is included in the first portion.

2. The ejection-material injecting method according to claim 1, wherein the pipe is cut off in the cutting step such that the blocked part is also included in the second portion.

3. The ejection-material injecting method according to claim 1, wherein a blocked state of the pipe is stabilized by deforming the pipe in the blocking step.

4. The ejection-material injecting method according to claim 3, wherein the pipe is deformed by application of external force in the blocking step.

5. The ejection-material injecting method according to claim 3, wherein the pipe is deformed by heating in the blocking step.

6. The ejection-material injecting method according to claim 1, wherein the blocking step includes a curing process to cure the ejection material in the pipe so as to block the pipe.

7. The ejection-material injecting method according to claim 1, wherein the pipe is a first pipe that connects a first connecting port of the tank to a first connected port of the container,
   wherein a second pipe connects a second connecting port of the tank to a second connected port of the container, and
   wherein a gas in the container is withdrawn into the tank through the second pipe in the injecting step.

8. The ejection-material injecting method according to claim 7, wherein the first pipe is blocked and then the second pipe is blocked in the blocking step.

9. The ejection-material injecting method according to claim 7, further comprising:
   a circulating step of circulating the ejection material between the tank and the container through the first pipe and the second pipe.

10. The ejection-material injecting method according to claim 1, further comprising:

a detecting step of detecting an amount of foreign substances contained in at least one of the ejection material in the container and the ejection material in the pipe, wherein the pipe is blocked in the blocking step on a condition that the amount of the foreign substances detected in the detecting step falls to or below a predetermined amount.

11. The ejection-material injecting method according to claim 1, further comprising:
a step of fitting a covering to cover the first portion after the cutting step.

12. The ejection-material injecting method according to claim 1, wherein the ejection apparatus is an imprint-material ejection apparatus configured to eject an imprint material as the ejection material contained in the container from the ejection head, and the imprint material as the ejection material contained in the tank is injected into the container through the pipe in the injecting step.

13. An ejection-material ejection apparatus comprising:
a container configured to contain an ejection material;
an ejection head capable of ejecting the ejection material in the container;
a first pipe connected to the container so as to inject the ejection material into the container;
a second pipe connected to the container so as to discharge the ejection material from the container; and
a covering configured to cover the first pipe,
wherein the first pipe includes a blocked part blocked after injection of the ejection material into the container, and a cut-off part cut off in such a way as to retain the blocked part.

14. An ejection-material ejection apparatus comprising:
a container configured to contain an ejection material;
an ejection head capable of ejecting the ejection material in the container;
a pipe connected to the container so as to inject the ejection material into the container; and
a covering configured to cover the pipe,
wherein the pipe includes a blocked part blocked after injection of the ejection material into the container, and a cut-off part cut off in such a way as to retain the blocked part,
wherein the container includes a passage provided separately from the pipe and connected to the container, and
wherein the passage includes:

a first opening being open to the container so as to supply the ejection material contained in the container into the passage; and
a second opening being open to the container so as to discharge the ejection material, which is supplied from the first opening into the passage, to the container, and
wherein a pump and a filter configured to filtrate the ejection material are provided in the passage between the first opening and the second opening.

15. The ejection-material ejection apparatus according to claim 14, further comprising a second pipe to discharge the ejection material from the container, and
wherein the second opening is connected to a connection port between the second pipe and the container.

16. An ejection-material ejection apparatus comprising:
a container configured to contain an ejection material;
an ejection head capable of ejecting the ejection material in the container;
a pipe connected to the container so as to inject the ejection material into the container; and
a covering configured to cover the pipe,
wherein the pipe includes a blocked part blocked after injection of the ejection material into the container, and a cut-off part cut off in such a way as to retain the blocked part,
wherein the container contains an imprint material as the ejection material, and
wherein the ejection head is capable of ejecting the imprint material in the container.

17. An imprinting apparatus configured to process a substrate by transferring a pattern of a mold to an imprint material applied to the substrate, comprising:
an imprint-material ejection apparatus configured to eject the imprint material in a container from an ejection head so as to apply the imprint material onto the substrate, wherein
the imprint-material ejection apparatus includes a pipe connected to the container so as to inject the imprint material into the container, and a covering configured to cover the pipe, and
the pipe includes a blocked part blocked after injection of the imprint material into the container, and a cut-off part cut off in such a way as to retain the blocked part.

* * * * *